UNITED STATES PATENT OFFICE.

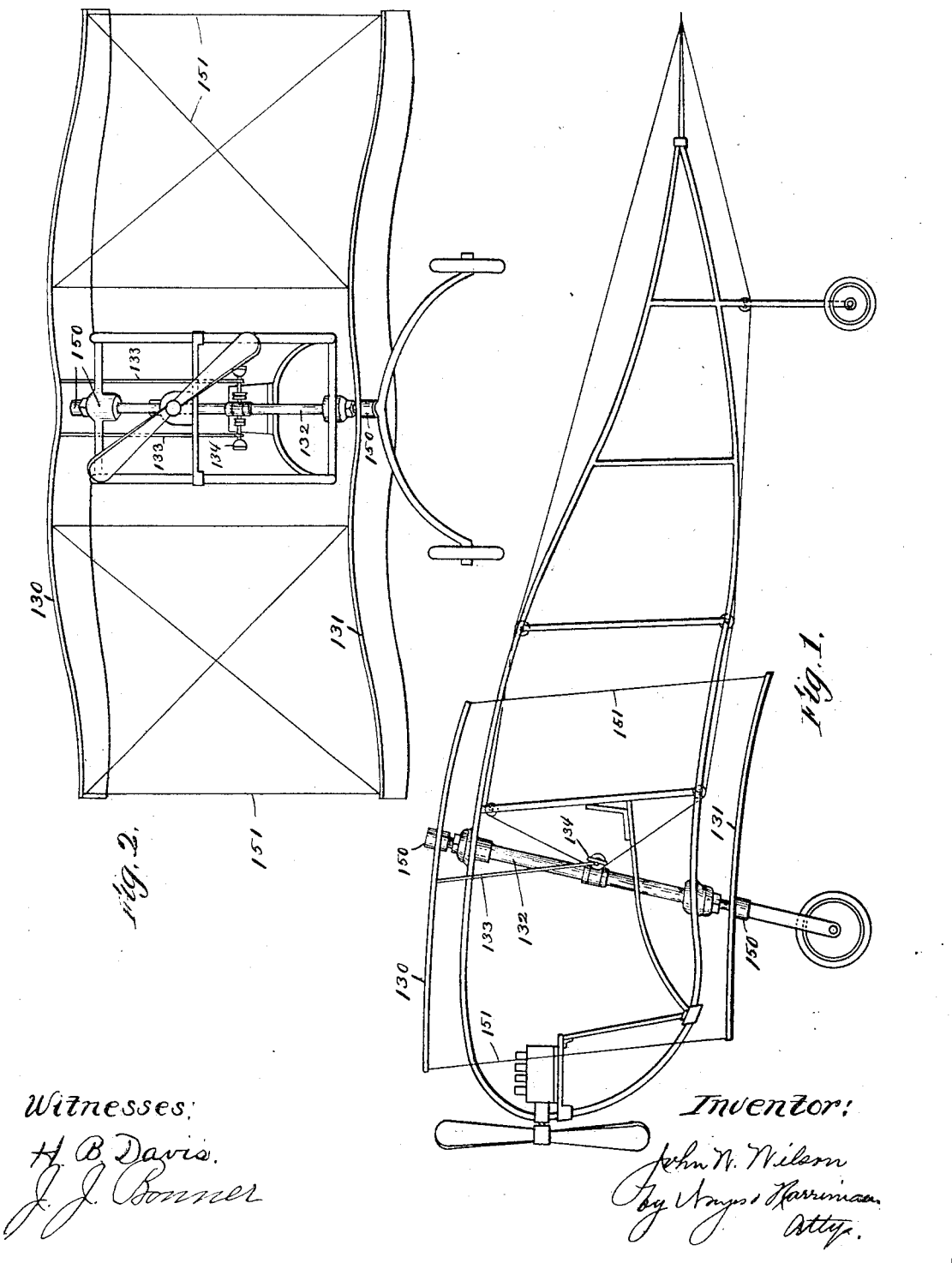

JOHN W. WILSON, OF BOSTON, MASSACHUSETTS.

FLYING-MACHINE.

1,091,555.      Specification of Letters Patent.      Patented Mar. 31, 1914.

Original application filed April 23, 1910, Serial No. 557,135. Divided and this application filed September 6, 1910. Serial No. 580,696.

*To all whom it may concern:*

Be it known that I, JOHN W. WILSON, residing at Boston, in the county of Suffolk and State of Massachusetts, have invented an Improvement in Flying-Machines, of which the following is a specification.

This invention relates to flying-machines, and is a division of my application for Letters Patent #557,135 filed April 23, 1910.

The invention has for its object the provision of one or more horizontally arranged planes mounted on a shaft arranged oblique to the perpendicular, and adapted to be moved on said shaft as a center, whereby they are caused to occupy planes more or less inclined to the horizontal as they are moved.

When two or more planes are employed they may be connected together to move simultaneously. The plane or planes may be large enough to serve as supporting planes and when arranged in accordance with and provided with means embodying this invention for moving them they also serve to maintain or assist in maintaining the lateral balance of the machine and to steer or assist in steering the machine around corners. The plane or planes, however, may be made small and arranged at the front of a machine having supporting planes, and when so arranged, will serve as a front control and also assist in maintaining lateral balance. In such case, means will be employed for moving the planes about a shaft arranged oblique to a perpendicular; and means will be employed for tilting the frame structure whereby the angles of incidence of the plane or planes may be varied.

Figure 3:
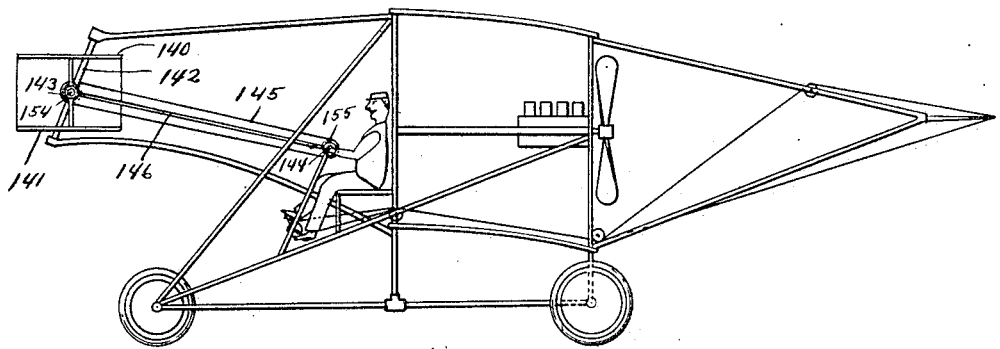
Figure 4:
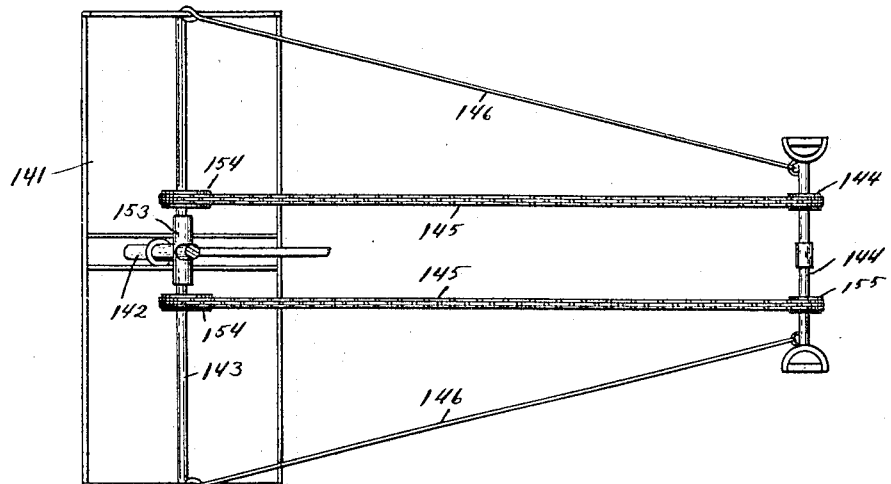

Figure 1 is a side elevation of a flying-machine embodying this invention. Fig. 2 is a front elevation of the flying-machine shown in Fig. 1. Fig. 3 is a side elevation of a flying-machine embodying a modified form of my invention. Fig. 4 is a plan view of the front control of the flying-machine shown in Fig. 3.

130, 131, represent a pair of planes of any suitable construction, the planes of the pair being arranged one above the other, and as here shown, in Figs. 1 and 2, above and below the operating mechanism. In Figs. 1 and 2 said planes are made large and extend from side to side of the machine and serve as supporting planes. They are mounted on a shaft 132, which is arranged oblique to the perpendicular and in the vertical plane of the machine, and are adapted to be moved on said shaft as a center. Said oblique shaft is rigidly connected at its ends with and forms a part of the frame structure, and it has sleeves 150 arranged on it to which the planes are connected, whereby the planes are supported on the shaft and permitted to move rotarily thereon. The two planes are connected together by suitable braces 151, whereby they are caused to move simultaneously. Rods 133, 133, are secured to one of the planes, as for instance to the upper plane, which extend down along each side of the oblique shaft, and the lower ends of said rods are connected to the opposite ends of a horizontal handle-bar 134, which is rotarily mounted on the oblique shaft or some other support, whereby it may be moved in a horizontal plane about said support as a center, and when so moved the rods 133, 133, will be moved by it to thereby turn the upper plane and consequently turn the lower plane which is connected with the upper plane about the oblique shaft as a center, causing said planes to occupy different inclined positions relative to a horizontal plane. For example, as said planes are moved on the oblique shaft, one end moves forward and upward and the other end moves rearward and downward. Swinging the ends of the planes, fore and aft, in this manner results in maintaining lateral balance of the machine and also in steering it around corners, in addition to serving as supporting planes for the machine; that is to say, by moving the supporting planes edgewise, fore and aft, about an axis oblique to the perpendicular, whereby the plane of movement thereof becomes more and more inclined to a horizontal plane as they are thus moved, enables them to be utilized to maintain lateral balance and to steer around corners.

Planes such as represented in Figs. 1 and 2 may be made smaller and arranged at the front of the machine to serve as and constitute a front control, and in Figs. 3 and 4 such embodiment of my invention is illustrated. Referring to said Figs. 3 and 4, 140, 141, represent respectively the upper and lower planes, and 142 a shaft arranged oblique to the perpendicular on which they are mounted, permitting movement thereof fore and aft in planes inclined to the horizontal. Said planes are connected together by rods or bars to move simultaneously. The plane structure has a horizontal shaft 143, provided at a point intermediate its length with means, as a collar 153, for mounting it on the oblique shaft, whereby the planes may be swung on said shaft as a center. The horizontal shaft 143 is adapted to be rocked on a horizontal axis to tilt the planes to vary their angles with respect to the horizontal. For the purpose of thus rocking the horizontal shaft 143 sprocket wheels 154 may be secured to said shaft over which sprocket chains 145 pass, which pass over sprocket wheels 155 secured to the handle-bar 144. By turning said handle-bar about a horizontal axis the horizontal shaft is rocked and the planes tilted. For the purpose of moving the plane structure on the oblique shaft as a center, rods 146, 146, are connected at their front ends to the opposite ends of the plane structure and at their rear ends to the opposite ends of the handle-bar 144, and by moving said handle-bar, as in steering, said planes will be moved. Instead of employing two planes connected together as a front control any number of planes may be employed.

I claim:—

1. In a flying machine, a plane movable about the axis oblique to the perpendicular longitudinal of the machine, the plane being permanently disposed at an angle to its axis other than right angle.

2. In a flying machine, a plane mounted for rotative movement and having a fixed angular relation other than right angle to the axis having an upward and rearward inclination with respect to the normal plane of the machine.

3. In a flying machine, a shaft inclining upwardly and rearwardly with respect to the plane of the machine, and a plane rotatably mounted on said shaft and disposed at an angle other than right angle.

4. In a flying machine, a shaft inclining upwardly and rearwardly with respect to the machine, a collar rotatably mounted on the shaft and a plane fixed on said collar and disposed at an angle thereto other than right angle.

5. In a flying machine, a shaft inclining upwardly and rearwardly with respect to the machine, a collar rotatably mounted on the shaft and a plane fixed on said collar and disposed at an angle thereto other than right angle, and means for rotating the collar to constantly vary the angular relation of the plane with respect to the shaft.

In testimony whereof I have signed my name to this specification in the presence of two subscribing witnesses.

JOHN W. WILSON.

Witnesses:
B. J. NOYES,
H. B. DAVIS.